(12) United States Patent
Navarro et al.

(10) Patent No.: US 7,714,775 B2
(45) Date of Patent: May 11, 2010

(54) METHOD FOR ACCURATE AUTO-CALIBRATION OF PHASED ARRAY ANTENNAS

(75) Inventors: Julio A. Navarro, Kent, WA (US); Richard N. Bostwick, North Bend, WA (US); Kerri Scott, Tustin, CA (US); Paul Norris, Issaquah, WA (US); James Blair, Corona, CA (US)

(73) Assignee: The Boeing Company, Chicago, IL (US)

( * ) Notice: Subject to any disclaimer, the term of this patent is extended or adjusted under 35 U.S.C. 154(b) by 205 days.

(21) Appl. No.: 11/958,177

(22) Filed: Dec. 17, 2007

(65) Prior Publication Data

US 2009/0153394 A1 Jun. 18, 2009

(51) Int. Cl.
*G01S 7/40* (2006.01)
(52) U.S. Cl. ...................................... 342/174
(58) Field of Classification Search ............. 342/174, 342/165
See application file for complete search history.

(56) References Cited

U.S. PATENT DOCUMENTS

| | | | |
|---|---|---|---|
| 4,949,090 A | 8/1990 | Tamii et al. | 342/173 |
| 4,994,813 A | 2/1991 | Shiramatsu et al. | 342/360 |
| 5,809,063 A | 9/1998 | Ashe et al. | 375/206 |
| 6,046,697 A * | 4/2000 | Overbury et al. | 342/174 |
| 6,163,296 A | 12/2000 | Lier et al. | 342/417 |
| 6,208,287 B1 | 3/2001 | Sikina et al. | 342/174 |
| 6,252,542 B1 | 6/2001 | Sikina et al. | 342/174 |
| 6,424,313 B1 | 7/2002 | Navarro et al. | 343/853 |
| 6,480,153 B1 | 11/2002 | Jung et al. | 342/368 |
| 6,670,930 B2 | 12/2003 | Navarro | 343/776 |
| 7,215,298 B1 * | 5/2007 | Fraschilla et al. | 342/174 |
| 2006/0192710 A1 | 8/2006 | Schieblich | 342/368 |
| 2009/0153394 A1* | 6/2009 | Navarro et al. | 342/174 |

FOREIGN PATENT DOCUMENTS

| | | |
|---|---|---|
| EP | 0 901 183 | 10/1999 |
| JP | 06-310929 | 4/1994 |

OTHER PUBLICATIONS

International Search Report and Written Opinion dated Mar. 25, 2009.

* cited by examiner

*Primary Examiner*—Dan Pihulic
(74) *Attorney, Agent, or Firm*—Hayes Soloway P.C.

(57) ABSTRACT

A method and apparatus is disclosed that is capable of verifying on site the health, calibration and integrity of individual phased array modules of a phased array antenna system and, in certain cases, enabling the phased array antenna system to overcome element failures by use of a beam-steering computer. The present disclosure provides a test probe or RF radiator in or adjacent the antenna array for supplying and receiving test and calibration signals.

19 Claims, 9 Drawing Sheets

METHOD FOR ACCURATE AUTO-CALIBRATION OF PHASED ARRAY ANTENNAS

FIELD

This disclosure relates generally to phased array antennas and more particularly to apparatus and methods used to calibrate Direct radiating Electronically Steerable Phased Array Antennas (ESAs).

BACKGROUND

Direct radiating Electronically Steerable Phased Array Antennas (ESAs) are generally comprised of multiple individual antenna elements spaced in a grid pattern on a flat or curved surface, the combined energy of individual elements forming the antenna. Steering of the antenna is accomplished by electronically adjusting the time delay or phase shift on individual elements in such a way that, for example, the energy received by each element from a plane wave in a selected direction combines coherently, whereas the energy in other directions does not. This process, commonly referred to as beamforming, is the fundamental basis for the ESA concept.

The pointing accuracy, which is the ability to obtain a desired beam shape and the ability to suppress sidelobes (gain responses in unwanted directions), is highly dependent on the precision and accuracy of the electronically controlled time delay or phase shift device in each element. The gain response of every antenna element must be precisely and accurately controllable and in wideband applications the frequency response characteristics must also be matched to achieve optimum results. As the operating frequency is increased the mechanical and electrical tolerances become critical, such that it has become impractical to fabricate antennas with the degree of process control required to achieve acceptable performance. This is particularly true for antennas operating at microwave frequencies.

One of the methods used in the manufacture of phased arrays is to place a small transmitting or receiving element in the near field of each element and to use it to measure the gain and phase or time delay characteristics of each individual element. A compensation table can then be generated and used to adjust the magnitude of the control voltages to correct for the gain and phase errors of individual elements. This process is time consuming and is typically only valid at the frequency and the ambient temperature at which the calibration measurements were made.

Other prior art examples use even more complex designs which provide an improved application-specific integrated circuit (ASIC) or a monolithic microwave integrated circuit with coupling. Further developments have used a combination of these prior art designs. See, for example, U.S. Pat. No. 6,163,296; U.S. Pat. No. 6,208,287; U.S. Pat. No. 6,252,542; and U.S. Pat. No. 6,480,153.

SUMMARY

To overcome the deficiencies of the prior art, the present disclosure provides a method and apparatus for built-in-test (BIT) and calibration of a phased array antenna that is capable of verifying the health and integrity of individual phased array modules and, in many cases, enables the phased array antenna to overcome element failures by use of a beamsteering computer to calculate revised element phase and amplitude parameters to help maintain desired beam profiles. The present disclosure provides one or more test probes in the form of an RF radiator deployed into the interior of the array in ways that do not generally have an adverse effect on how the phased array antenna is fabricated.

More particularly, one aspect of the present disclosure provides a phased array antenna with built-in test capability. The apparatus is generally comprised of a phased array antenna system having a plurality of individual antenna elements and control circuits for each individual antenna element, the elements forming a beam forming network; a calibration probe, preferably a monopole radiator that is able to transmit or receive a modulated signal supplied from an input source or in the case of an array that has both transmit and receive capability one or more of the array elements could be used in lieu of the radiator; and a beamsteering computer. Further embodiments include a pseudorandom noise generator for generating a repeating pseudorandom code sequence; a power divider for sending identical copies of the pseudorandom code sequence to the input source modulator and a programmable delay circuit; a detection circuit; at least one analog/digital converter; and various filters as needed for processing the signals at different points in the calibration system.

In another aspect, the present disclosure provides a method for calibrating a phased array antenna system, wherein the phased array antenna system comprises a plurality of antenna elements and a beamsteering computer. According to the method for receive array calibration disclosed herein, a calibration probe, mounted adjacent the individual antenna elements, radiates a known signal. The known signal is preferably modulated and may be coded with a pseudorandom code sequence to enable an accurate measurement of the time delay. The code sequence is simultaneously sent to a programmable delay circuit. The signal from the calibration probe is received by a single antenna element and sent to a detection circuit. The beamsteering computer compares the output signal to the code sequence from the programmable delay circuit, which is adjusted for each of the individual antenna elements. For transmit array calibration, the known signal is sent from individual antenna elements and received by the calibration test probe. This calibration method may be completed quickly, providing an accurate health analysis of individual array elements.

More particularly, in one aspect the disclosure provides a method for receive array calibration of a phased array antenna system, wherein the phased array antenna system comprises a plurality of antenna elements, a beamsteering computer, and a calibration probe, comprising the steps of:

(a) generating a broadband, bi-phase modulated input signal;

(b) exciting the calibration probe with the input signal;

(c) setting one of the plurality of antenna elements to receive;

(d) receiving the input signal radiated from the calibration probe at the antenna element set to receive;

(e) demodulating the received signal and analyzing it with the beamsteering computer to determine the health of the antenna element; and (f) repeating the steps (c)-(e) for each remaining antenna element.

In another aspect, the disclosure provides a method for transmit array calibration of a phased array antenna system, wherein the phased array antenna system comprises a plurality of antenna elements, a beamsteering computer, and a calibration probe, comprising the steps of:

(a) generating a broadband, bi-phase modulated input signal;

(b) setting one of the plurality of antenna elements to transmit;

(c) exciting the antenna element set to transmit with the input signal;

(d) receiving the input signal radiated from the antenna element set to transmit at the calibration probe;

(e) demodulating the received signal and analyzing it with the beamsteering computer to determine the health of the antenna element; and (f) repeating the steps (c)-(e) for each remaining antenna element.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

The features, functions and advantages that have been discussed can be achieved independently in various embodiments of the present disclosure or may be combined in yet other embodiments further details of which can be seen with reference to the following description and drawings, wherein like numerals depict like parts, and wherein.

DESCRIPTION

Figure 1:
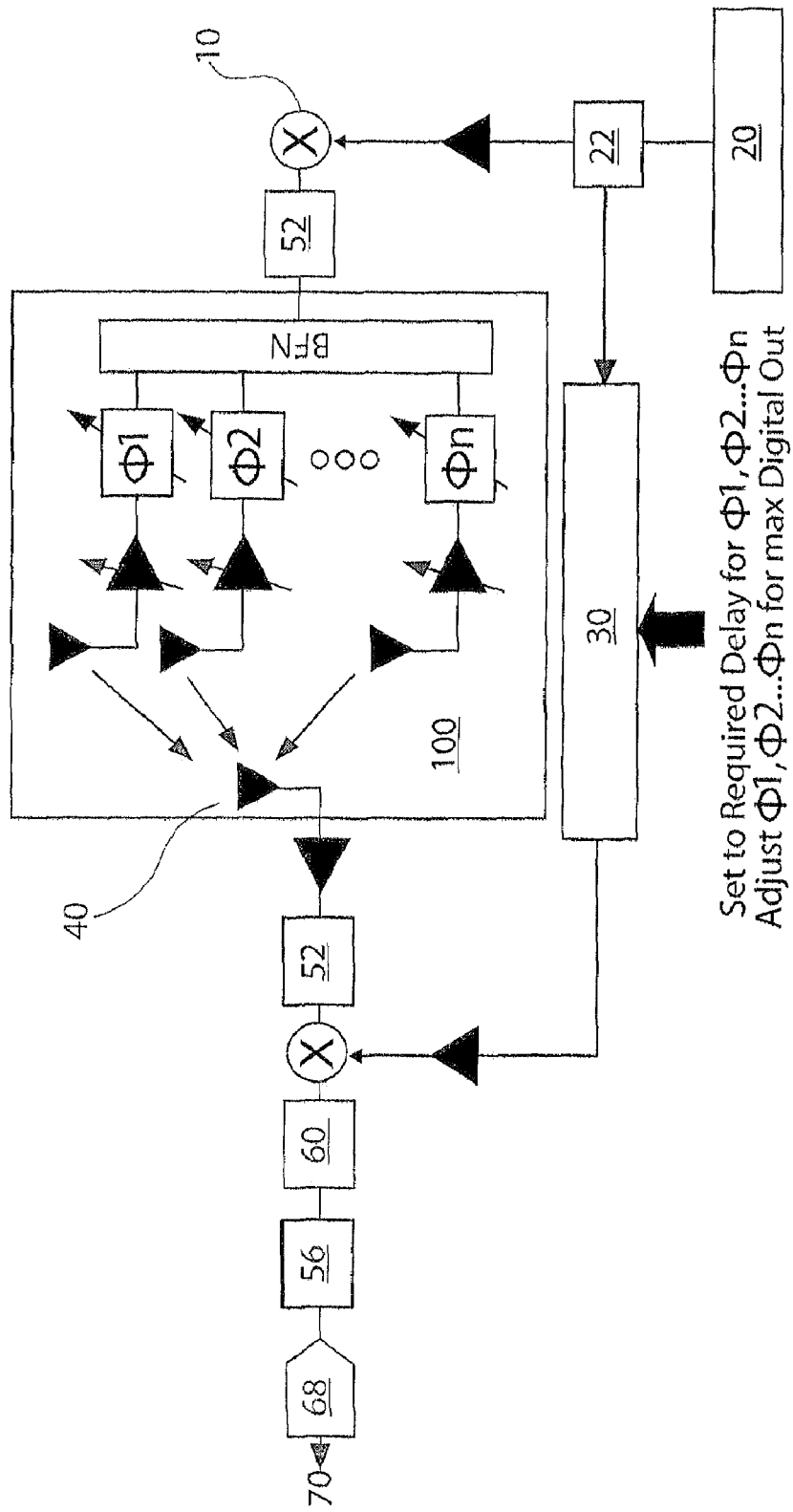
FIGS. 1 and 2 are block diagrams illustrating a phased array antenna configured for transmit array or receive array calibration, respectively, in accordance with an embedment of the present disclosure.

In the following description, reference is made to the accompanying drawings, which form a part hereof, and in which is shown, by way of illustration, various embodiments of the present disclosure.

The present disclosure provides a phased array antenna having a test probe in the form of an RF radiator deployed into or adjacent the interior of the array. The test probe RF radiator operates independently of the array, supplying and receiving test and calibration signals. In one embodiment, the test probe comprises a partially bored coaxial cable forming an RF or monopole radiator which is mounted through a via extending into the interior of or adjacent the phased array antenna.

Instead of sequentially stepping a near field reference source or receiving device from element to element as suggested by the prior art, one common radiating or receiving source is nominally located in the center of the grid of receiving or radiating elements. Since we know the distances between the center source and receiving elements, and since the propagation velocity of radio signals is a constant, we can calculate the exact radio wave propagation delay to each and every antenna element. By subtracting this delay we can calibrate each element in the same way we would calibrate it with a near field reference device.

While this approach is adequate for many applications, as the operating bandwidth increases or the temperature changes, the characteristics of the individual antenna elements also change rendering single frequency, single temperature calibration less accurate.

To circumvent these issues we use the combination of a broadband signal coupled with periodic calibration both at startup and during operation where permitted. The broadband signal is more representative of the type of signals typically transmitted or received by phased arrays and therefore provides calibration across a band of frequencies resulting in better overall accuracy. Periodic calibration removes the time and temperature dependent changes in individual element characteristics.

To generate the broadband signal we direct sequence bi-phase modulate a radio carrier centered at the desired phased array operating frequency with a repeating pseudo random code generated by a digital maximum length sequence generator. A quadrature phase or other signal could also be used. The purpose of the modulation is two fold. First, it spreads the signal to facilitate more accurate measurement as previously described, and second, it puts markers on the carrier so that time delay can be measured unambiguously. The length of the sequence should be much greater than the expected time delay through any of the phased array antenna elements and associated beam-forming networks, and the clock rate of the bi-phase modulator, commonly referred to as the chip rate in spread spectrum systems, should be chosen to spread the signal over the desired bandwidth. Higher chip rates allow calibration over larger bandwidths and lower chip rates support calibration over narrower bandwidths.

Figure 2:
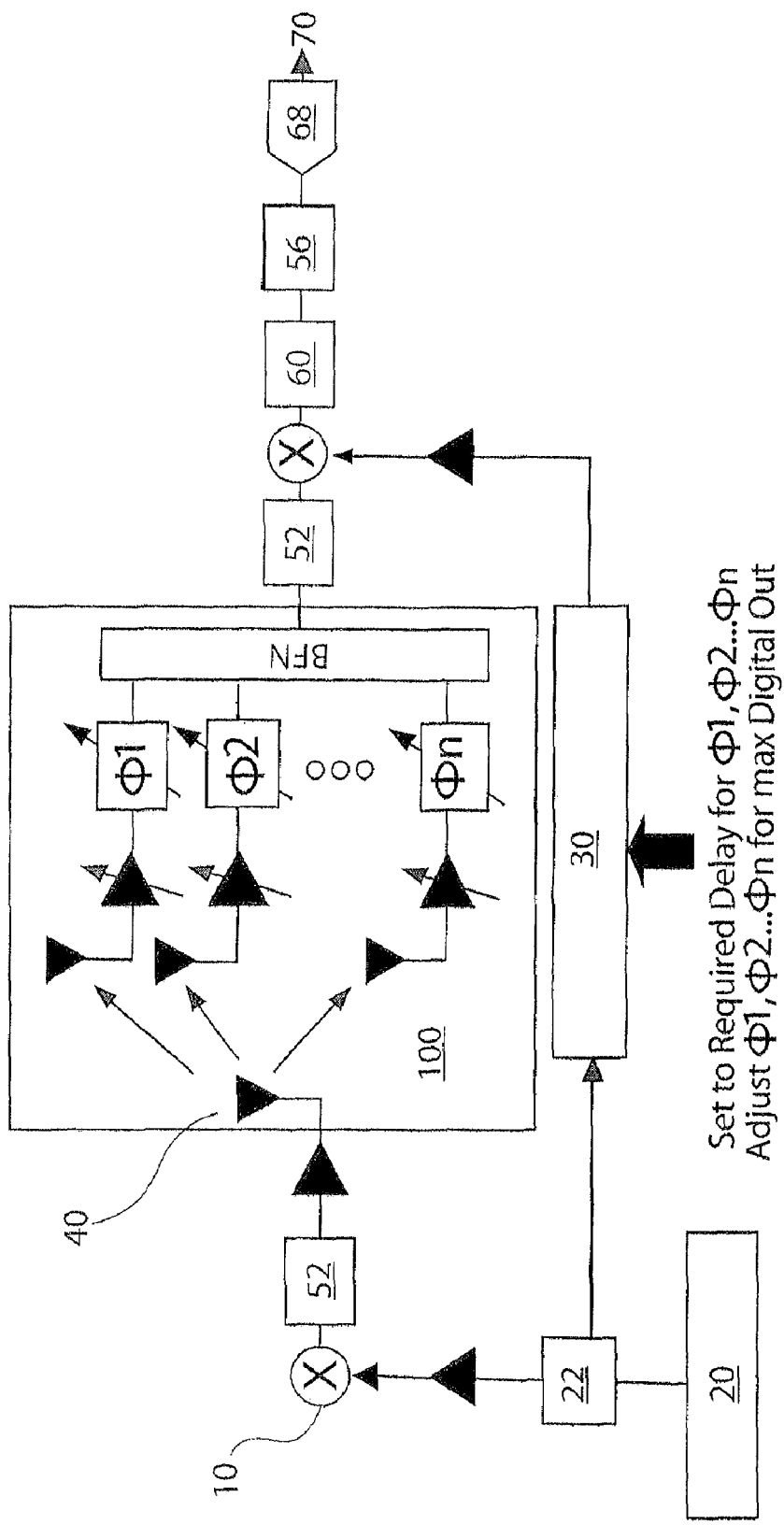
Figure 3A:
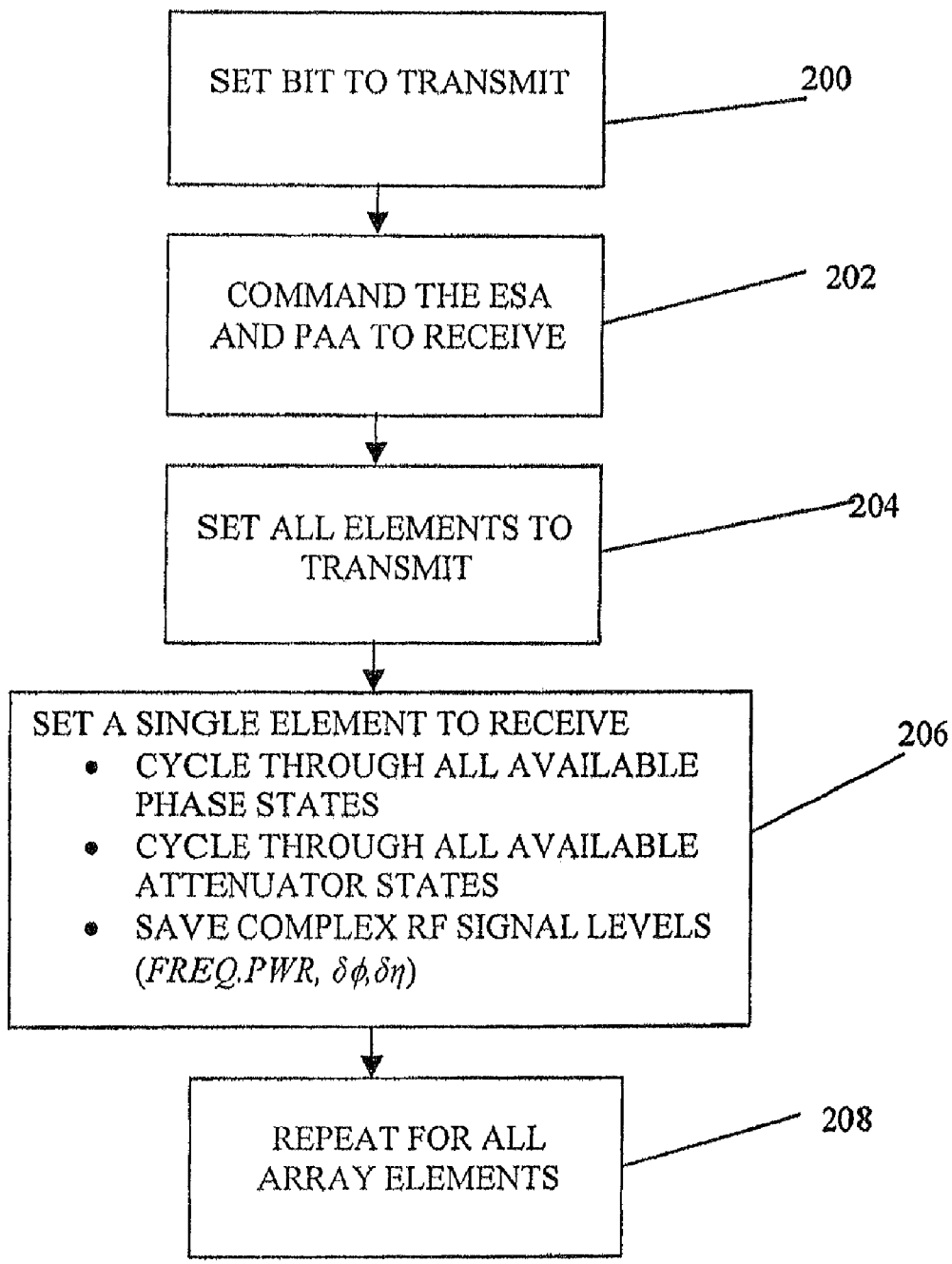
FIGS. 3a and 3b are block is a flow diagrams illustrating calibrating a phased array antenna in accordance with the present disclosure.
Figure 3B:
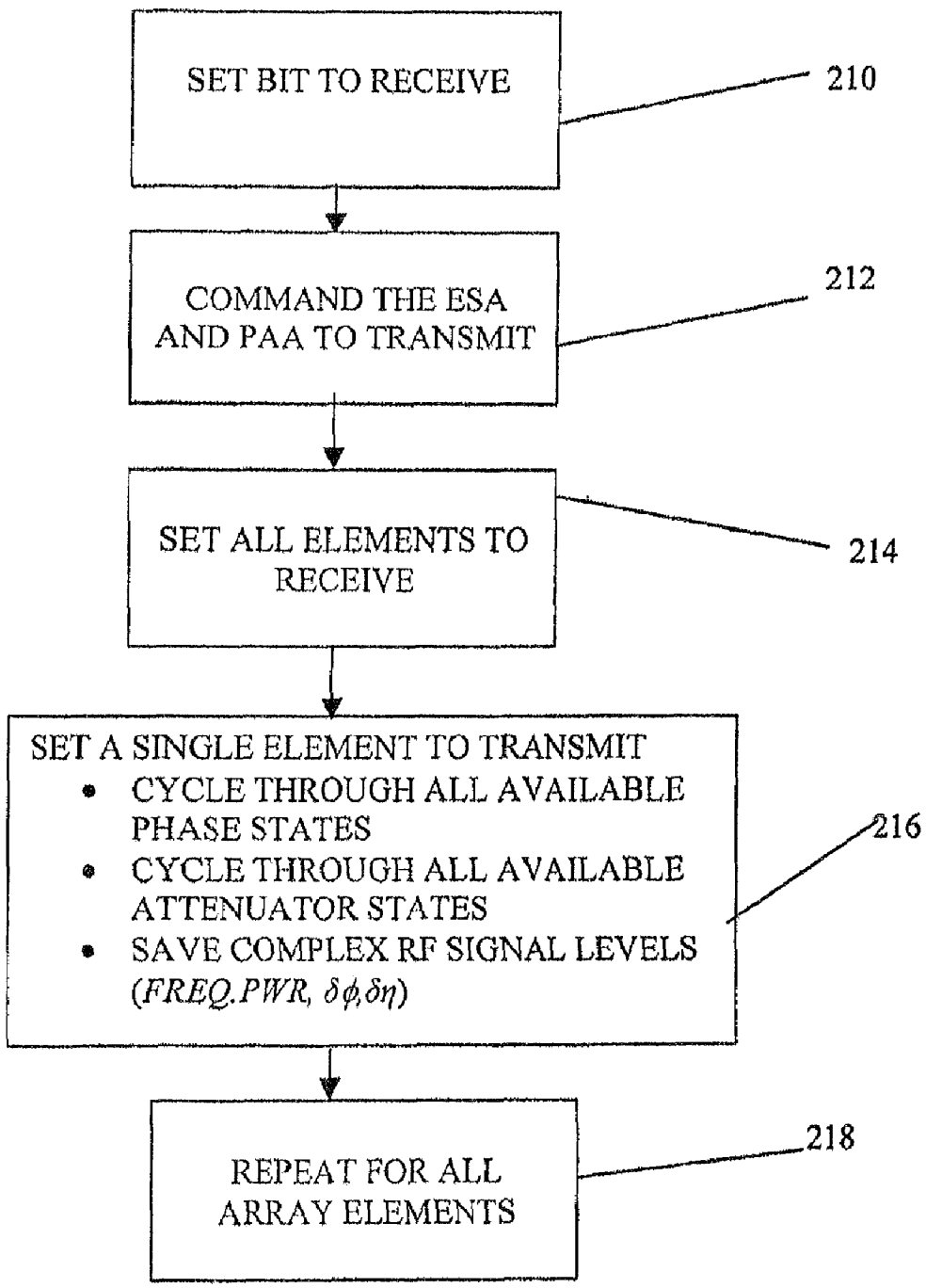

The calibration process is best understood by referring to the block diagrams of FIGS. 1-3b, FIGS. 1 and 3a showing the configuration for transmit array calibration, and FIGS. 2 and 3b showing the configuration for receive array calibration. In each instance, a pseudorandom code is generated by pseudorandom noise (PN) sequence generator, then equally distributed by a power divider 22, such that signals with identical phase and amplitude are sent to the reference signal input modulator 10 and to the programmable delay line 30. The programmable delay is adjusted according to the expected delay for the individual antenna element being measured.

For larger arrays the programmable delay line 30 could be implemented by a combination of digital and analog hardware. For small arrays a programmable analog delay line may be sufficient. The accuracy of calibration is a function of the resolution available in the programmable delay line and the number of bits used to digitize the output signal 70.

When calibrating the array for transmission (see FIG. 1), the code modulated signal is sent through a band pass filter 52 to the phased array antenna or phased array antenna sub-array 100 and the beam forming network (BFN). The signal is then transmitted through the individual antenna elements (Φ1 through Φn) to calibration probe 40. When calibrating the array to receive (see FIG. 2), the coded signal is sent through a band pass filter 52 to the phased array antenna or phased array antenna sub-array 100 through calibration probe 40. The signal is received from the calibration probe by the individual antenna elements (Φ1 through Φn) of the beam forming network (BFN).

The broadband bi-phase code modulated signal is used to individually excite each antenna element in the case of a transmit phased array, or to excite the center probe in the case of a receiving phased array. To function properly, both transmit and receive arrays must be designed to allow each antenna elements to be individually activated. This means that although all antenna elements may be fully powered to maintain their input or output impedances, the input to output RF path must be limited to that of the individual element that is being calibrated. One of the ways to accomplish this objective would be to turn the gain of the variable gain amplifiers in every antenna element except the one being calibrated to zero or to incorporate switches in each antenna element to disable the RF signal path.

Referring again to FIGS. 1 and 2, the output signal is sent through a band pass filter 52 to a detection circuit 60. The output from the detection circuit is sent through a low pass filter 56 to an analog/digital converter 68, resulting in a digital output 70.

In another embodiment, the disclosure provides the user with a simple approach to confirm the health calibration, integrity and available functions of each module in the array in real-time. FIGS. 3a and 3b list the method steps, whereby the above embodiments can be used to calibrate a phased array antenna. Referring first to FIG. 3a, the first step 200 of the bit set transmit and transmits a command to the ESA and the PAA to receive in a step 202. All of the elements are then set to transmit in a step 204 and each element is then set to receive and cycled through all the available phase states, all available attenuator states and complex RF signal levels in a step 206. The process is repeated for each of the remaining array elements in a step 208.

Referring to FIG. 3b, the overall process is as follows. First, the bit is set to receive in a step 210. A command signal is sent to the ESA and the PAA to transmit in a step 212. All of the elements are then set to receive in a step 214. Then, a single element is set to transmit and cycle through all available phase states, all available attenuator states and complex RF signal levels in a step 216. The process is then repeated for each of the array elements in a step 218. Though each antenna element in the array is tested individually, this method can be completed in a very short time. This information is then provided to the beamsteering computer. Thus, if the failures are not catastrophic, the beam-steering computer can reconfigure the scanning parameters to account for elements that are not functioning adequately. The embodiments discussed below are inexpensive and simple to implement, as they do not require major modifications to existing hardware and can be easily incorporated in new designs.

Figure 4:
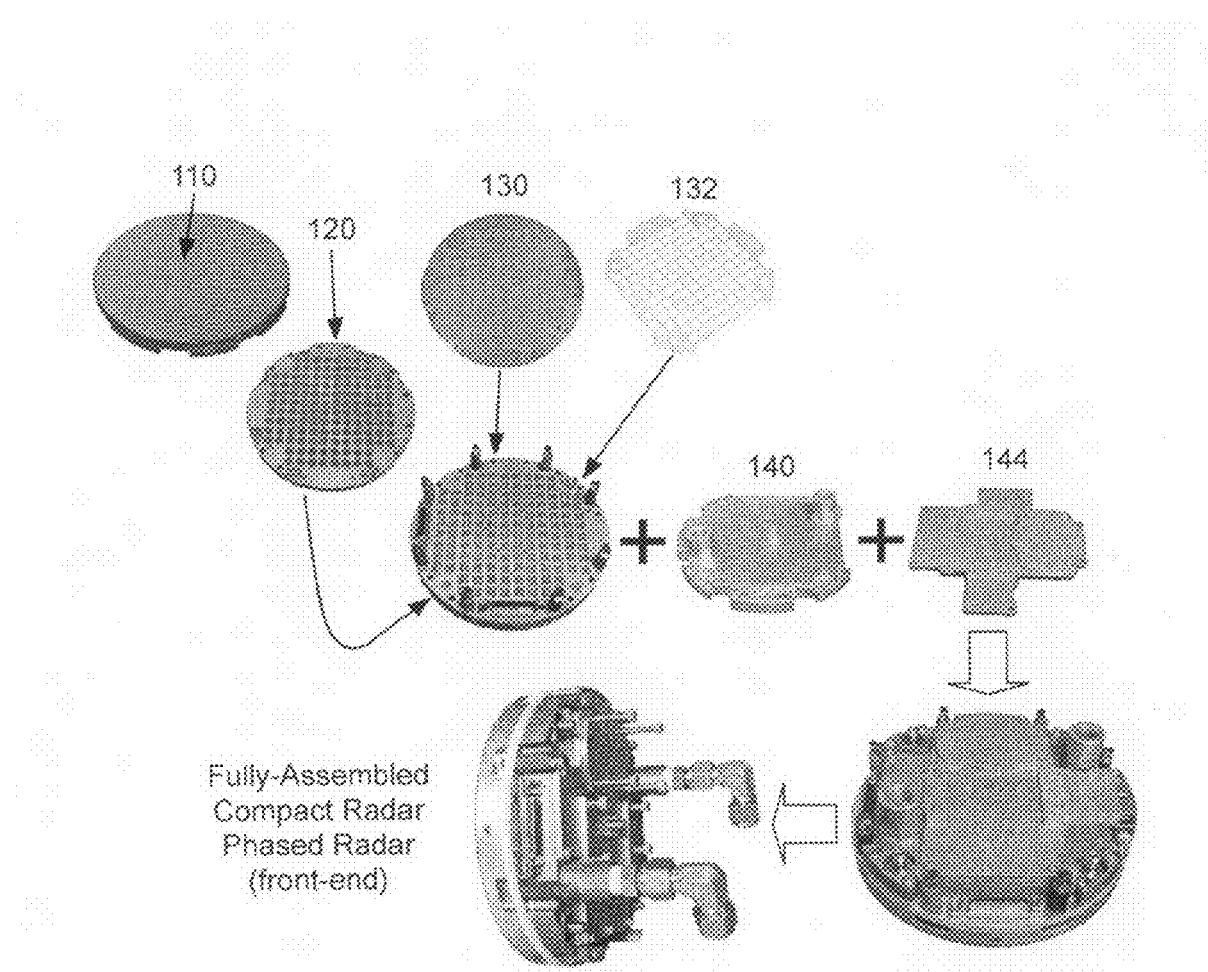
FIG. 4 is an exploded view of a phased array antenna with built-in-test capability in accordance with one embodiment of the disclosure.
Figure 5:
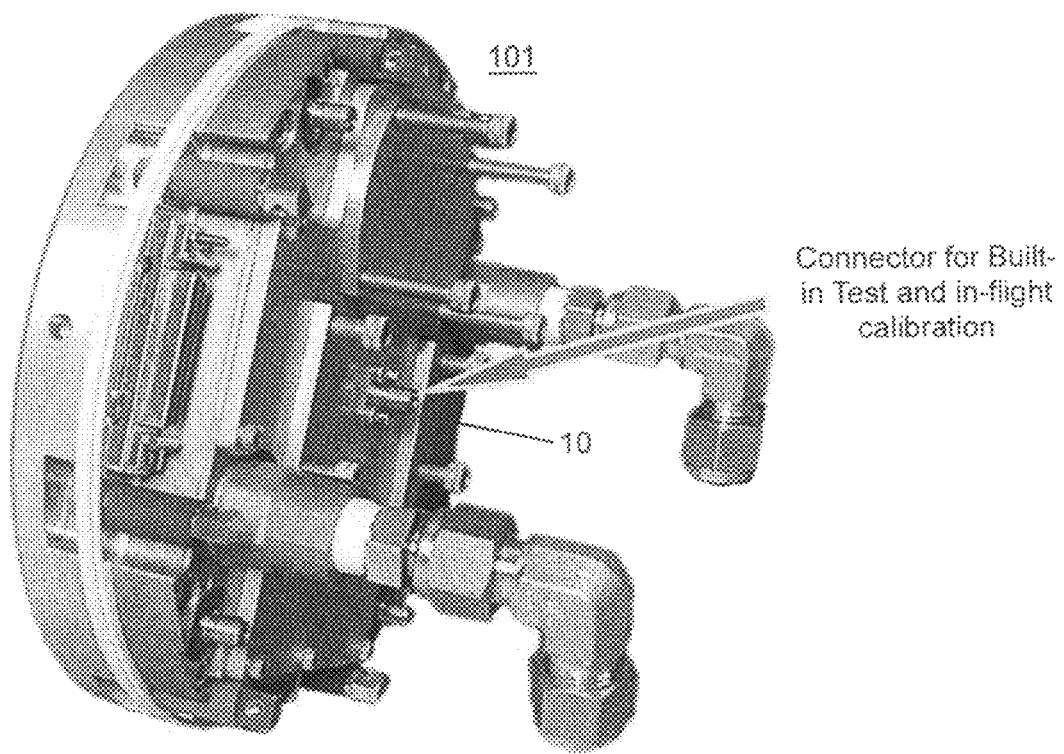
FIG. 5 is a drawing of the fully assembled phased array antenna of FIG. 4.

The present disclosure can be readily added to many existing prior art phased array antennas without affecting their performance. Referring to FIGS. 4 and 5 a compact phased array antenna 101 includes a wide angle impedance matching (WAIM) structure including, a honeycomb waveguide structure 120, and an antenna-integrated printed wiring (AiPWB) 130. These components are assembled between a cold plate 140 and an adapter plate 144 on one side, and a back plate 110 on the other side and sealed with a seal ring 132. A small via and a coaxial cable connector 10 are provided in the cold plate 140 for accommodating a coaxial cable containing an RF or monopole radiator as will be described below.

Figure 6:
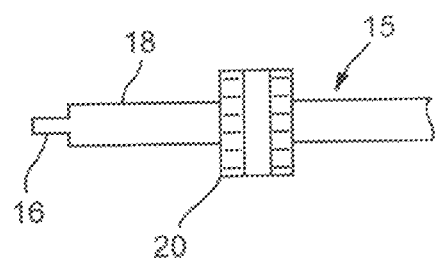
FIG. 6 shows details of a probe useful in accordance with the FIGS. 4 and 5 embodiment.

Referring now to FIG. 6, a coaxial cable connector containing an RF or monopole radiator in accordance with the present disclosure includes a probe assembly 15 including a coaxial cable which is stripped partially bare at its distal end 16. The bare distal end acts as an RF or monopole radiator for supplying test and calibration signals to individual antenna modules contained within the array and to receive signals from the individual antenna modules. The probe assembly 15 includes a shielded body portion 18 for insertion through holes in one or more interior structures within the antenna 101. A screw connector 20 is provided on the proximal end of the probe assembly 15.

A sample phased array antenna with probe assembly as above-described and illustrated in FIG. 5 was built and was initially tested using a near-field planar scanner, after which the BIT connector function was confirmed in the antenna range. Continuous wave signals were transmitted through the BIT connector and detected independently by the various modules set to receive mode. While the antenna elements near the center of the array showed somewhat higher coupling levels than those along the edges, there remained sufficient dynamic range to determine the module health and phase-shifter functionality of all the antenna elements in the array.

Figure 7:
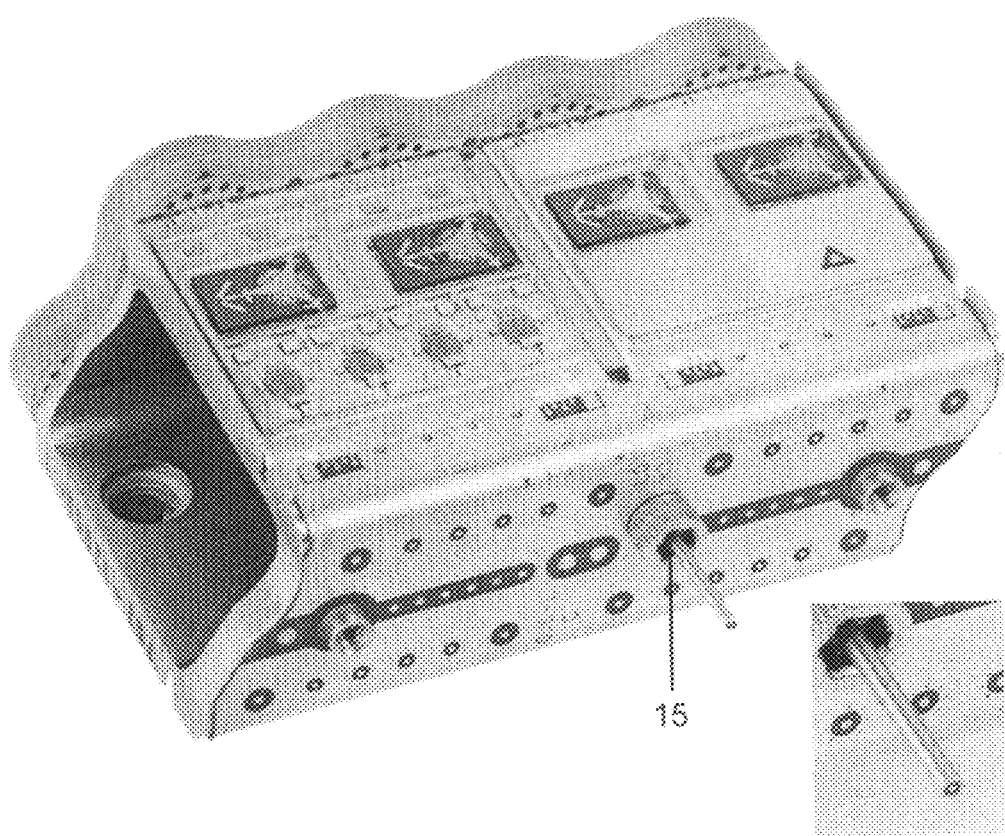
FIGS. 7 and 8 are drawings, front and back, of phased array antennas with three-dimensional stacked architecture and built-in-test capability; in accordance with another embodiment of the disclosure.
Figure 8:
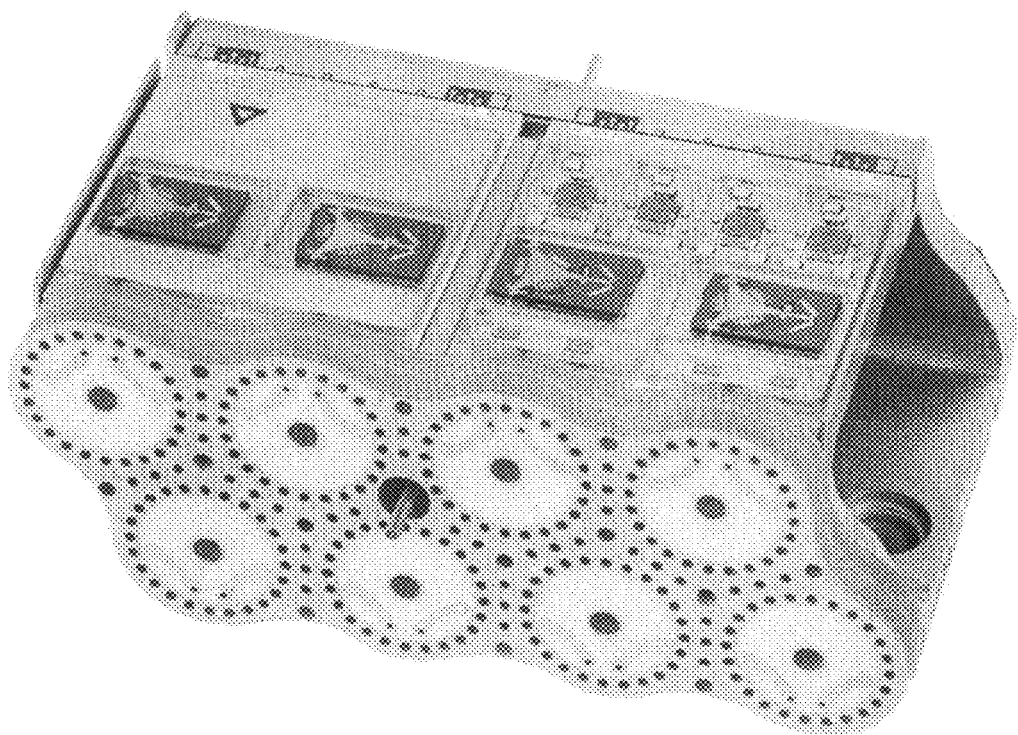
Figure 9:
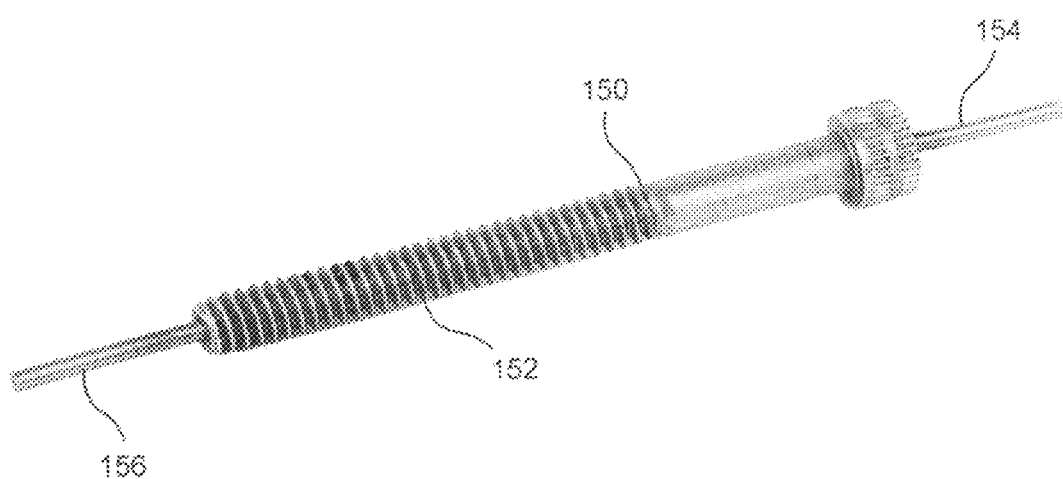
FIG. 9 is a drawing of a probe useful in accordance with the FIGS. 7 and 8 embodiment.

In another embodiment, a monopole probe is incorporated into a phased array antenna having a "flashcube" packaging architecture such as disclosed in U.S. Pat. No. 6,424,313, incorporated herein by reference. Referring to FIGS. 7-9, a probe 150 in the form of a threaded screw is provided and provides access from the back side of the array to the honeycomb waveguide and into the WAIM. As shown in FIG. 9, the probe includes a fastening screw 152 which is hollow to accommodate a coaxial cable 154. The distal end 156 of the cable is stripped bare. The probe 150 is inserted a position where it protrudes past the honeycomb waveguide and into the WAIM. The coaxial conductor, together with the ground plane, creates an RF or monopole radiator. The exact length of the RF or monopole radiator is optimized to balance RF or monopole efficiency with the effect on the scanning properties of the array.

FIG. 7 shows a phased array module, without the backplate and AiPWB, with the probe 150 inserted. The AiPWB distributes DC power, logic and RF signals to each of the modules in the array. The back-plate provides mechanical support for each of the modules and to house the BIT connector. FIG. 8 shows a front-side of the module with the exposed end 156 of the cable protruding therefrom.

It should be emphasized that the above-described embodiments of the present device and process, particularly, and "preferred" embodiments, are merely possible examples of implementations and merely set forth for a clear understanding of the principles of the disclosure. Many different embodiments of a method and apparatus for built-in test and calibration of a phased array antenna as described herein may be designed and/or fabricated without departing from the spirit and scope of the disclosure. All these and other such modifications and variations are intended to be included herein within the scope of this disclosure and protected by the following claims. Therefore the scope of the disclosure is not intended to be limited except as indicated in the appended claims.

The invention claimed is:

1. A method for receive array calibration of a phased array antenna system, wherein the phased array antenna system comprises a plurality of antenna elements, a beamsteering computer, and a calibration probe, comprising the steps of:
   (a) generating a broadband, bi-phase modulated input signal;
   (b) exciting the calibration probe with the input signal;
   (c) setting one of the plurality of antenna elements to receive;
   (d) receiving the input signal radiated from the calibration probe at the antenna element set to receive;
   (e) demodulating the received signal and analyzing it with the beamsteering computer to determine the health of the antenna element; and (f) repeating the steps (c)-(e) for each remaining antenna element;

wherein the phased array antenna system further comprises a plurality of individual element control circuits, wherein each of the individual element control circuits controls one of the plurality of antenna elements with respect to phase state, and wherein each antenna element set to receive is cycled through multiple phase states.

2. The method of claim 1, wherein each of the individual element control circuits controls one of the plurality of antenna elements with respect to attenuator state, and wherein each antenna element set to receive is cycled through multiple attenuator states.

3. The method of claim 1, further comprising the step of controlling the antenna elements to compensate for a lack of health determined by the beamsteering computer.

4. The method of claim 1, wherein the input signal is a continuous wave signal.

5. The method of claim 1, wherein the input signal is a broadband, quadrature phase signal.

6. The method of claim 1, wherein a repeating pseudorandom sequence generated by a digital maximum length sequence generator is used to code the input signal.

7. The method of claim 6, wherein a duplicate repeating pseudorandom sequence is sent to the beamsteering computer by way of a programmable delay circuit to facilitate analysis of the health of the antenna elements.

8. A method for transmit array calibration of a phased array antenna system, wherein the phased array antenna system comprises a plurality of antenna elements, a beamsteering computer, and a calibration probe, comprising the steps of:

(a) generating a broadband, bi-phase modulated input signal;

(b) setting one of the plurality of antenna elements to transmit;

(c) exciting the antenna element set to transmit with the input signal;

(d) receiving the input signal radiated from the antenna element set to transmit at the calibration probe;

(e) demodulating the received signal and analyzing it with the beamsteering computer to determine the health of the antenna element; and (f) repeating the steps (c)-(e) for each remaining antenna element;

wherein the phased array antenna system further comprises a plurality of individual element control circuits, wherein each of the individual element control circuits controls one of the plurality of antenna elements with respect to phase state, and wherein each antenna element set to receive is cycled through multiple phase states.

9. The method of claim 8, wherein each of the individual element control circuits controls one of the plurality of antenna elements with respect to attenuator state, and wherein each antenna element set to receive is cycled through multiple attenuator states.

10. The method of claim 8, further comprising the step of controlling the antenna elements to compensate for a lack of health as determined by the beamsteering computer.

11. The method of claim 8, wherein the input signal is a continuous wave signal.

12. The method of claim 8, wherein the input signal is a broadband, quadrature phase signal.

13. The method of claim 8, wherein a repeating pseudorandom sequence generated by a digital maximum length sequence generator is used to code the known signal.

14. The method of claim 13, wherein a duplicate repeating pseudorandom sequence is sent to the beamsteering computer by way of a programmable delay circuit to facilitate analysis of the health of the antenna elements.

15. A phased array antenna system with built-in test capability, comprising a beam forming network comprised of a plurality of individual antenna elements and individual control circuits for each individual antenna element;

a calibration probe;

an input source providing a modulated signal; and a beamsteering computer;

wherein each of the individual control circuits controls one of the individual antenna elements with respect to phase state and attenuator state.

16. The phased array antenna system of claim 15, further comprising a pseudorandom noise generator for generating a repeating pseudorandom code sequence; and a power divider for dividing the pseudorandom code sequence and sending identical pseudorandom code sequences to the input source modulator and to a programmable delay circuit.

17. The phased array antenna system of claim 16, further comprising a detection circuit; at least one analog/digital converter; and one or more filters for processing the signals at different points in the calibration system.

18. The phased array antenna system of claim 15, wherein the calibration probe is a coaxial monopole radiator.

19. The phased array antenna system of claim 18, wherein the calibration probe is assembled through a via into the interior of the phased array antenna.

* * * * *